(12) United States Patent
Komiya et al.

(10) Patent No.: US 9,998,019 B2
(45) Date of Patent: Jun. 12, 2018

(54) DC-DC CONVERTER, AND SOLAR POWER CONTROLLER AND MOBILE BODY USING SAME

(71) Applicant: Sharp Kabushiki Kaisha, Osaka-shi, Osaka (JP)

(72) Inventors: Kenji Komiya, Osaka (JP); Takeshi Shiomi, Osaka (JP); Masaru Nomura, Osaka (JP); Akihide Shibata, Osaka (JP); Hiroshi Iwata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 278 days.

(21) Appl. No.: 14/431,828

(22) PCT Filed: Sep. 30, 2013

(86) PCT No.: PCT/JP2013/076494
§ 371 (c)(1),
(2) Date: Mar. 27, 2015

(87) PCT Pub. No.: WO2014/054562
PCT Pub. Date: Apr. 10, 2014

(65) Prior Publication Data
US 2017/0012546 A1 Jan. 12, 2017

(30) Foreign Application Priority Data

Oct. 5, 2012 (JP) ................. 2012-223446

(51) Int. Cl.
*H02M 3/335* (2006.01)
*H02M 1/088* (2006.01)

(52) U.S. Cl.
CPC ....... *H02M 3/33592* (2013.01); *H02M 1/088* (2013.01); *Y02B 70/1475* (2013.01)

(58) Field of Classification Search
CPC .............. H02M 1/088; H02M 3/33592; Y02B 70/1475
See application file for complete search history.

(56) References Cited

U.S. PATENT DOCUMENTS

| 2004/0136207 A1* | 7/2004 | Havanur | ........... H02M 3/33592 363/21.06 |
| 2006/0139823 A1* | 6/2006 | Shoji | ....................... H02M 1/34 361/56 |

(Continued)

FOREIGN PATENT DOCUMENTS

| JP | 2013-085448 A | 5/2013 |
| JP | 2013-236544 A | 11/2013 |

OTHER PUBLICATIONS

K.Krismer, "Accurate Power Loss Model Derivation of a High-Current Dual Active Bridge Converter for an Automotive Application," IEEE Transactions on Industrial Electronics 57 (3) (2010): 11 pages.

(Continued)

*Primary Examiner* — Adolf Berhane
*Assistant Examiner* — Bart Iliya
(74) *Attorney, Agent, or Firm* — Harness, Dickey & Pierce, P.L.C.

(57) ABSTRACT

A DC-DC converter includes a transformer, a switching circuit provided on the primary side of the transformer, and a rectifier circuit provided on the secondary side of the transformer. The rectifier circuit includes a first rectifier part that is serially connected body of a first transistor and a second transistor having a first electrode connected to a second electrode of the first transistor. The first and second transistors each include a parasitic diode connected forward between the second and first electrode, and the withstanding voltage between the first and second electrodes of the first (Continued)

transistor is higher than the withstanding voltage between the first and second electrodes of the second transistor.

15 Claims, 8 Drawing Sheets

(56) References Cited

U.S. PATENT DOCUMENTS

| | | | | |
|---|---|---|---|---|
| 2010/0157638 A1* | 6/2010 | Naiknaware | ........ | H02M 7/4807 363/131 |
| 2010/0321966 A1* | 12/2010 | Mochikawa | ............ | H02M 1/08 363/123 |
| 2011/0090604 A1* | 4/2011 | Butler | ........................ | H03F 1/52 361/18 |
| 2013/0083580 A1 | 4/2013 | Komiya et al. | | |
| 2014/0334193 A1* | 11/2014 | Meyer | ............... | H02M 3/33584 363/21.01 |

OTHER PUBLICATIONS

International Search Report PCT/ISA/210 for International Application No. PCT/JP2013/026494 dated Dec. 9, 2013.

\* cited by examiner

DC-DC CONVERTER, AND SOLAR POWER CONTROLLER AND MOBILE BODY USING SAME

CROSS REFERENCE TO RELATED APPLICATIONS

This is a National Phase Application of PCT/JP2013/076494 filed Sep. 30, 2013, which is an International Application claiming priority to JP 2012-223446 filed on Oct. 5, 2012, the entire contents of each of which are hereby incorporated by reference.

TECHNICAL FIELD

The present invention relates to a DC-DC converter using a transformer, a solar power controller and a mobile body that use the DC-DC converter.

BACKGROUND ART

A DC-DC converter using a transformer is provided with a rectification portion on a secondary side.

In a two-way DC-DC converter, which is disclosed in a non-patent document 1 and uses a transformer, each of four rectification portions disposed on a secondary side is composed of a single MOS transistor.

CITATION LIST

Non-Patent Literature

Non-patent document 1: Florian Krismer, Johann W. Kolar, "Accurate Power Loss Model Derivation of a High-Current Dual Active Bridge Converter for an Automotive Application", IEEE TRANSACTIONS ON INDUSTRIAL ELECTRONICS, VOL. 57, NO. 3, MARCH 2010

SUMMARY OF INVENTION

Technical Problem

However, in the two-way DC-DC converter disclosed in the non-patent document 1, each of the four rectification portions disposed on the secondary side is composed of a single MOS transistor; accordingly, there is a problem that a large recovery current (reverse recovery current) flows in a parasitic diode of the MOS transistor; a large loss occurs; and electricity transmission efficiency dramatically declines during a low power transmission period.

In the meantime, to solve the recovery current problem, it is conceivable to compose each rectification portion on the secondary side by using a fast recovery diode. However, in this case, synchronous rectification is impossible; accordingly, there is a problem that the efficiency declines compared with the case where each rectification portion on the secondary side is composed of a MOS transistor.

In light of the above situation, it is an object of the present invention to provide a highly efficient DC-DC converter, a solar power controller and a mobile body that use the DC-DC converter.

Solution to Problem

A DC-DC converter according to the present invention has a structure (first structure) that comprises: a transformer, a switching circuit disposed on a primary side of the transformer, and a rectification circuit disposed on a secondary side of the transformer, wherein the rectification circuit includes a first rectification portion that is a series-connected body of a first transistor and a second transistor whose first electrode is connected to a second electrode of the first transistor, each of the first and second transistors has a parasitic diode that is connected in a forward direction between the second and first electrodes, and a withstand voltage between the first and second electrodes of the first transistor is higher than a withstand voltage between the first and second electrodes of the second transistor.

Besides, in the DC-DC converter having the above first structure, a structure (second structure) may be employed, in which the rectification circuit is a rectification bride circuit that includes: a second rectification portion that is a series-connected body of a third transistor and a fourth transistor whose first electrode is connected to a second electrode of the third transistor, a third rectification portion that is a series-connected body of a fifth transistor and a sixth transistor whose first electrode is connected to a second electrode of the fifth transistor, a fourth rectification portion that is a series-connected body of a seventh transistor and an eighth transistor whose first electrode is connected to a second electrode of the seventh transistor, wherein the first electrode of the first transistor is connected to the first electrode of the fifth transistor, the second electrode of the second transistor is connected to the first electrode of the third transistor, the second electrode of the sixth transistor is connected to the first electrode of the seventh transistor, the second electrode of the fourth transistor is connected to the second electrode of the eighth transistor, each of the third, fourth, fifth, sixth, seventh, and eighth transistors has a parasitic diode that is connected in a forward direction between the second and first electrodes, a withstand voltage between the first and second electrodes of the third transistor is higher than a withstand voltage between the first and second electrodes of the fourth transistor, a withstand voltage between the first and second electrodes of the fifth transistor is higher than a withstand voltage between the first and second electrodes of the sixth transistor, and a withstand voltage between the first and second electrodes of the seventh transistor is higher than a withstand voltage between the first and second electrodes of the eighth transistor.

Besides, in the DC-DC converter having the above first structure, a structure (third structure) may be employed, in which the rectification circuit includes a second rectification portion that is a series-connected body of a third transistor and a fourth transistor whose first electrode is connected to a second electrode of the third transistor, the first electrode of the first transistor is connected to the first electrode of the third transistor, each of the third and fourth transistors has a parasitic diode that is connected in a forward direction between the second and first electrodes, and a withstand voltage between the first and second electrodes of the third transistor is higher than a withstand voltage between the first and second electrodes of the fourth transistor.

Besides, in the DC-DC converter having any one of the above first to third structures, a structure (fourth structure) may be employed, in which all (2k−1)th (k is a natural number) transistors included in the rectification circuit are transistors of depletion type, and all (2k)th (k is a natural number) transistors included in the rectification circuit are transistors of enhancement type.

Besides, in the DC-DC converter having any one of the above first to third structures, a structure (fifth structure) may be employed, in which all (2k−1)th (k is a natural number) transistors and all (2k)th (k is a natural number) transistors included in the rectification circuit are transistors of enhancement type.

Besides, in the DC-DC converter having any one of the above first to fifth structures, a structure (sixth structure) may be employed, in which an output voltage from the DC-DC converter is set in a range of 100 V to 1000 V.

Besides, a solar power controller according to the present invention has a structure which comprises the DC-DC converter having any one of the above first to sixth structures.

Besides, a mobile body according to the present invention has a structure which comprises the DC-DC converter having any one of the above first to sixth structures.

Advantageous Effects of Invention

According to the present invention, it is possible to achieve high efficiency of a DC-DC converter.

DESCRIPTION OF EMBODIMENTS

First Embodiment

Figure 1:
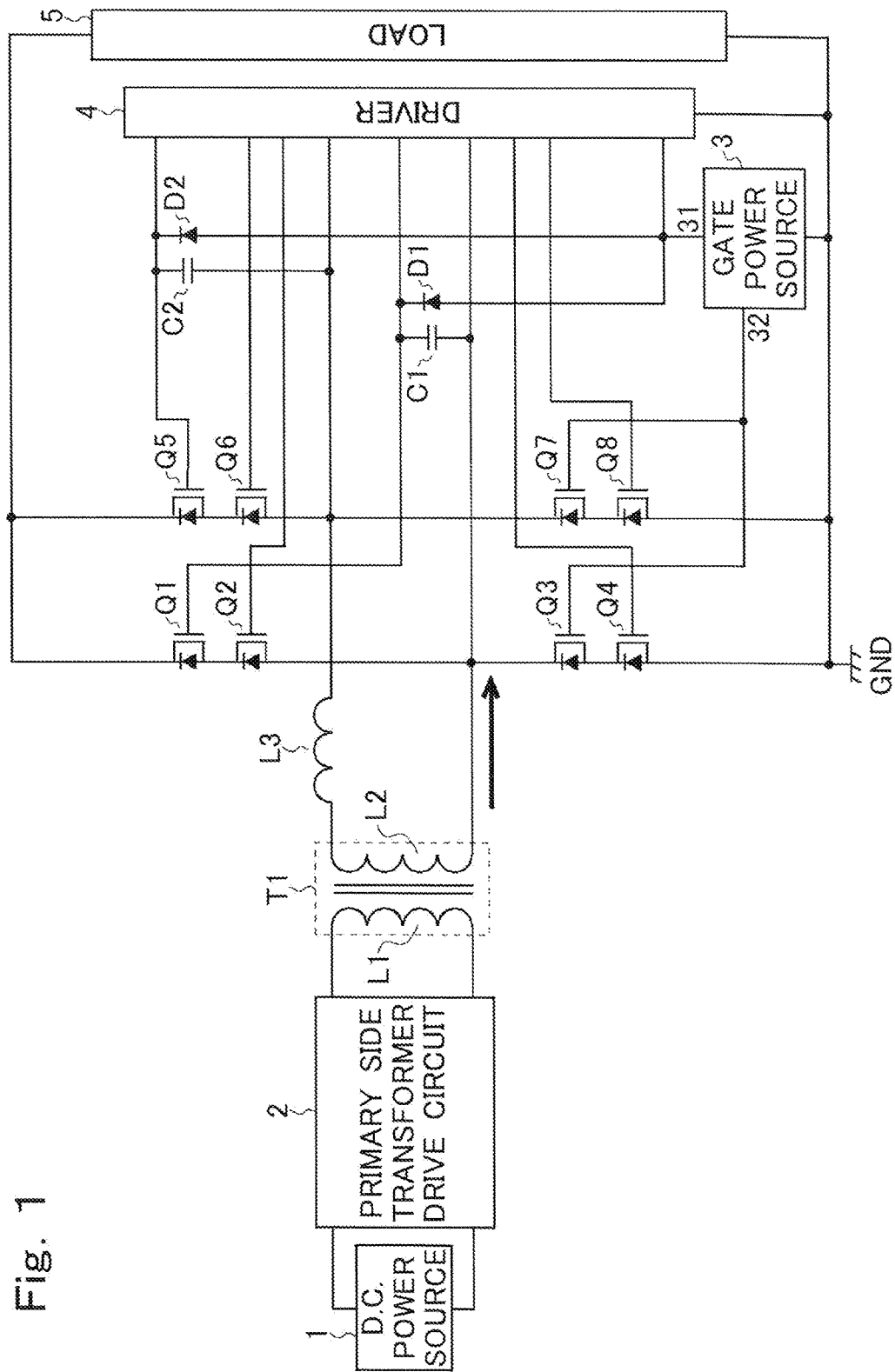
FIG. 1 is a circuit block diagram showing a structure of a DC-DC converter according to a first embodiment of the present invention.

A DC-DC converter according to a first embodiment of the present invention includes, as shown in FIG. 1, a primary side transformer drive circuit 2, a transformer T1, a smoothing reactor L3, N-channel MOS transistors Q1 to Q8, capacitors C1 and C2, diodes D1 and D2, a gate power source 3, and a driver 4, applies DC-DC conversion to a d.c. voltage output from a d.c. power source 1, and supplies a d.c. voltage (output voltage) after the DC-DC conversion to a load 5.

The output voltage from the DC-DC converter according to the first embodiment of the present invention is not especially limited, but in a case where the output voltage is large, an effect by high efficiency becomes remarkable compared with the two-way DC-DC converter disclosed in the non-patent document 1; accordingly, it is desirable that the output voltage from the DC-DC converter according to the first embodiment of the present invention is set in a range of 100 V to 1000 V, for example.

The primary side transformer drive circuit 2 is a switching circuit which has a switching element, converts the d.c. power output from the d.c. power source 1 into a transformer drive voltage by switching of the switching element, and supplies the transformer drive voltage to a primary winding L1 of the transformer T1. In the primary side transformer drive circuit 2, it is possible to use a circuit of, for example, full bridge type, half bridge type, push-pull type, forward type, fly back type or the like.

An electric current occurring in a secondary winding L2 of the transformer T1 is smoothed by the smoothing reactor L3, rectified by a rectification bridge circuit that includes the transistors Q1 to Q8, thereafter, supplied to the load 5.

Each of the transistors Q1 to Q8 incorporates a parasitic diode. An anode of the parasitic diode is connected to a source of one of the transistors Q1 to Q8 corresponding to the parasitic diode, and a cathode of the parasitic diode is connected to a drain of the one of the transistors Q1 to Q8 corresponding to the parasitic diode.

Each of the transistors Q1, Q3, Q5, and Q7 is a high withstand voltage transistor whose on-resistance is, for example, 0.099Ω, and whose source-drain withstand voltage is 600 V, for example. Each of the transistors Q2, Q4, Q6, and Q8 is a low withstand voltage transistor whose on-resistance is, for example, 0.079Ω, and whose source-drain withstand voltage is 30 V, for example.

Generally, a recovery current of a low withstand voltage transistor is smaller than a recovery current of a high withstand voltage transistor. Because of this, in the present embodiment, the recovery currents of the low withstand voltage transistors Q2, Q4, Q6, and Q8 are set to be smaller than the recovery currents of the high withstand voltage transistors Q1, Q3, Q5, and Q7.

Both drains of the transistors Q1, Q5 are connected to one end of the load 5. Drains of the transistors Q2, Q6 are connected respectively to sources of the transistors Q1, Q5; a source of the transistor Q2 is connected to a drain of the transistor Q3 and one end of the secondary winding L2 of the transformer T1; and a source of the transistor Q6 is connected to a drain of the transistor Q7 and the other end of the secondary winding L2 of the transformer T1 via the smoothing reactor L3. Drains of the transistors Q4, Q8 are connected respectively to sources of the transistors Q3, Q7; and both sources of the transistors Q4, Q8 are connected to a line of a ground voltage GND.

Cathodes of the diodes D1, D2 are connected respectively to gates of the transistors Q1, Q5. A first output terminal 31 of the gate power source 3 is connected to anodes of the diodes D1, D2 and the driver 4. A second output terminal 32 of the gate power source 3 is connected to gates of the transistors Q3, Q7. The gate power source 3 outputs, from a first output node, a d.c. voltage (e.g., 0.2 to 50 V) that is higher than a sum voltage of a threshold value voltage VTH of each of the high withstand voltage transistors Q1, Q5 (e.g., transistors of enhancement type whose threshold value voltage VTH=0.1 to 7 V) and a forward drop voltage of the diodes D1, D2, and outputs, from a second output node, a d.c. voltage (e.g., 0.2 to 50 V) that is higher than a threshold value voltage VTH of each of the high withstand voltage transistors Q3, Q7 (e.g., transistors of enhancement type whose threshold value voltage VTH=0.1 to 7 V).

The capacitor C1 is connected between the gate of the transistor Q1 and the one end of the secondary winding L2 of the transformer T1. The capacitor C2 is connected between the gate of the transistor Q5 and the smoothing reactor L3. In the meantime, the capacitor C1 is disposed to apply, to the gate of the transistor Q1, a voltage which is a sum of a voltage from the one end of the secondary winding L2 of the transformer T1 and a voltage from the first output terminal 31 of the gate power source 3. The capacitor C2 is disposed to apply, to the gate of the transistor Q5, a voltage which is a sum of a voltage from an end portion of the smoothing reactor L3 not-connected to the secondary winding L2 and the voltage from the first output terminal 31 of the gate power source 3. For example, when the one end of the secondary winding L2 of the transformer T1 is at the ground potential, the output potential from the gate power source 3 is applied to the gate of the high withstand voltage transistor Q1 via the diode D1. Thereafter, even if the potential of the one end of the secondary winding L2 of the transformer T1 rises, a potential difference between the one end of the secondary winding L2 of the transformer T1 and the gate of the high withstand voltage transistor Q1 is kept because of the capacitance coupling of the capacitors C1, C2. Likewise, also a potential difference between the end portion of the smoothing reactor L3 not-connected to the secondary winding L2 and the gate of the high withstand voltage transistor Q5 is kept at the output voltage from the gate power source 3.

The gates of the transistors Q1, Q2, Q4, Q5, Q6, and Q8, the one end of the secondary winding L2 of the transformer T1, and the end portion of the smoothing reactor L3 not-connected to the secondary winding L2 are connected to the driver 4. The driver 4 controls gate voltages of the transistors Q2, Q4, Q6, and Q8 to perform on/off control of the transistors Q2, Q4, Q6, and Q8.

Next, operation of the DC-DC converter according to the first embodiment of the present invention is described. In the case where the DC-DC converter according to the first embodiment of the present invention supplies d.c. power to the load 5, first the gate power source 3 goes to an on-state; a d.c. voltage, which is higher than the sum voltage of the threshold value voltage VTH of each of the high withstand voltage transistors Q1, Q5 and the forward drop voltage of the diodes D1, 2D, is applied to the gate of each of the high withstand voltage transistors Q1, Q5; and a d.c. voltage, which is higher than the threshold value voltage VTH of each of the high withstand voltage transistors Q3, Q7, is applied to the gate of each of the high withstand voltage transistors Q3, Q7.

In this state, in a case where an electric current is output, in an arrow direction of FIG. 1, from the secondary winding L2 of the transformer T1 because of the transformer drive voltage from the primary side transformer drive circuit 2, first the low withstand voltage transistors Q2, Q8 are turned on by the driver 4. In this way, also the high withstand voltage transistors Q1, Q7 are turned on and the electric current is supplied to the load 5.

Next, the low withstand voltage transistors Q2, Q8 are turned off by the driver 4 at a timing (timing when the absolute value of the electric current in the arrow direction of FIG. 1 flowing from the secondary winding L2 of the transformer T1 decreases to reach a predetermined value near zero) when a predetermined time elapses after the electric current in the arrow direction of FIG. 1 begins to flow from the secondary winding L2 of the transformer T1 because of the transformer drive voltage from the primary side transformer drive circuit 2. At this time, if a reflux current flows in the DC-DC converter according to the first embodiment of the present invention, the electric current flows back in an electric-current route that includes: channel portions of the high withstand voltage transistors Q1, Q7 kept at the on-state; and parasitic diodes of the low withstand voltage transistors Q2, Q8 in the off-state. In this way, the recovery currents flow in the low withstand voltage transistors Q2, Q8. However, the recovery currents of the low withstand voltage transistors Q2, Q8 are smaller than the recovery currents of the high withstand voltage transistors Q1, Q7; accordingly, recovery characteristics of the low withstand voltage transistors Q2, Q8 are good. Besides, the reflux current flows in the channel portions of the high withstand voltage transistors Q1, Q7 kept at the on-state; accordingly, also recovery characteristics of the high withstand voltage transistors Q1, Q7 are good. Therefore, recovery characteristics of each of: a rectification portion including the high withstand voltage transistor Q1 and the low withstand voltage transistor Q2; and a rectification portion including the high withstand voltage transistor Q7 and the low withstand voltage transistor Q8 become good.

Next, the low withstand voltage transistors Q4, Q6 are turned on at a timing when the reflux current disappears. In this way, if the high withstand voltage transistors Q3, Q5 also are turned on and an electric current in a direction opposite to the arrow direction of FIG. 1 begins to be output from the secondary winding L2 of the transformer T1 because of the transformer drive voltage from the primary side transformer drive circuit 2, an electric current is supplied to the load 5.

Next, the low withstand voltage transistors Q4, Q6 are turned off by the driver 4 at a timing (timing when the absolute value of the electric current in the direction opposite to the arrow direction of FIG. 1 flowing from the secondary winding L2 of the transformer T1 decreases to reach a predetermined value near zero) when a predetermined time elapses after the electric current in the direction opposite to the arrow direction of FIG. 1 begins to flow from the secondary winding L2 of the transformer T1 because of the transformer drive voltage from the primary side transformer drive circuit 2. At this time, if a reflux current flows in the DC-DC converter according to the first embodiment of the present invention, the electric current flows back in an electric-current route that includes: channel portions of the high withstand voltage transistors Q3, Q5 kept at the on-state; and parasitic diodes of the low withstand voltage transistors Q4, Q6 in the off-state. In this way, the recovery currents flow in the low withstand voltage transistors Q4, Q6. However, the recovery currents of the low withstand voltage transistors Q4, Q6 are smaller than the recovery currents of the high withstand voltage transistors Q3, Q5; accordingly, recovery characteristics of the low withstand voltage transistors Q4, Q6 are good. Besides, the reflux current flows in the channel portions of the high withstand voltage transistors Q3, Q5 kept at the on-state; accordingly, also recovery characteristics of the high withstand voltage transistors Q3, Q5 are good. Therefore, recovery characteristics of each of: a rectification portion including the high withstand voltage transistor Q3 and the low withstand voltage transistor Q4; and a rectification portion including the high withstand voltage transistor Q5 and the low withstand voltage transistor Q6 become good.

Hereinafter, likewise, the d.c. power is supplied to the load 5.

In a case where the DC-DC converter according to the first embodiment of the present invention stops the supply of the d.c. power to the load 5, the gate power source 3 goes to an off-state, the gates of the transistors Q1, Q3, Q5, and Q7 are brought to a "L" level, and the transistors Q1, Q3, Q5, and Q7 are fixed at an off-state. Besides, also the transistors Q2, Q4, Q6, and Q8 are fixed at the off-state by the driver 4. In the meantime, one capacitor may be connected between the gates of the transistors Q3, Q4, and another capacitor may be connected between the gates of the transistors Q7, Q8. Besides, a cathode and an anode of one diode may be connected to the gates of the transistors Q3, Q4, respectively, and also a cathode and an anode of another diode may be connected to the gates of the transistors Q7, Q8, respectively.

Figure 2:
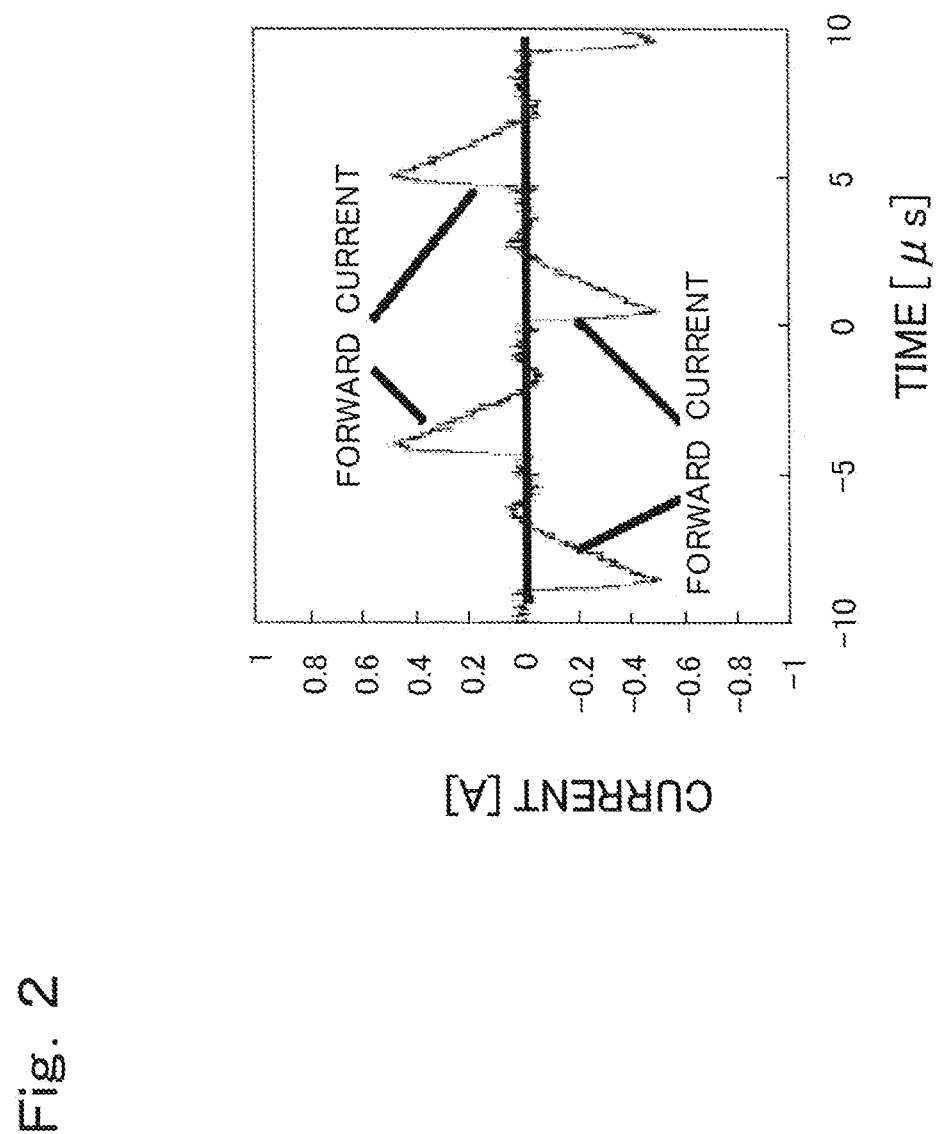
FIG. 2 is a time chart showing a measurement result of an electric current output from a secondary winding of a transformer during a low power transmission period of the DC-DC converter according to the first embodiment of the present invention.
Figure 3:
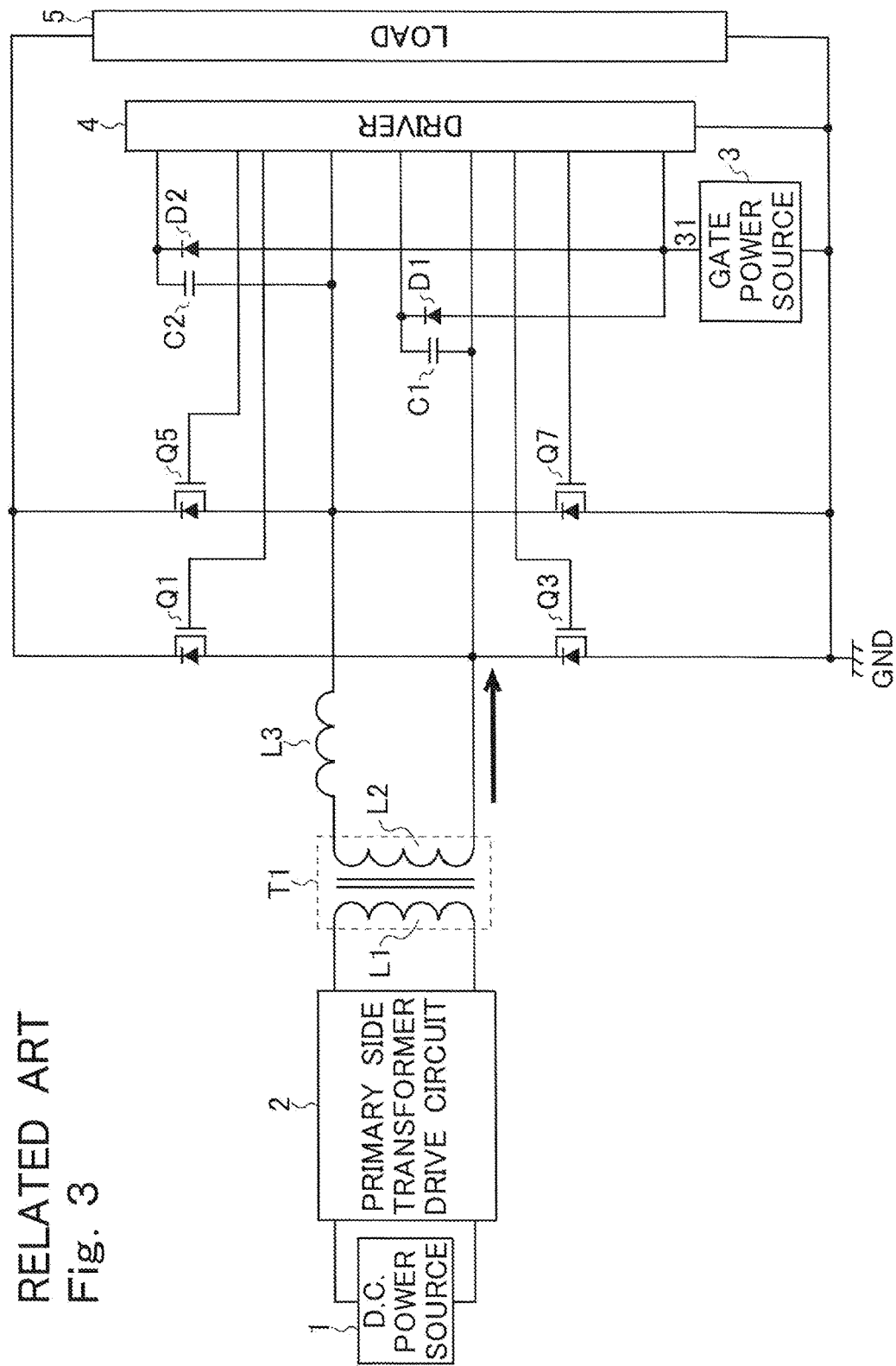
FIG. 3 is a circuit block diagram showing a structure of a DC-DC converter as a comparative example.

FIG. 2 shows a measurement result of the electric current output from the secondary winding L2 of the transformer T1 during a low power transmission period when the DC-DC converter according to the first embodiment of the present invention supplies low power (output voltage 250 V, output current 0.1 A) to the load 5. Besides, as a comparative example, FIG. 4 shows a measurement result of the electric current output from the secondary winding L2 of the transformer T1 during a low power transmission period when a DC-DC converter, in which each of four rectification portions is disposed on the secondary side, composed of a single high withstand voltage transistor whose on-resistance is, for example, 0.099 Ω and whose source-drain withstand voltage is, for example, 600 V and shown in FIG. 3, supplies low power (output voltage 250 V, output current 0.1 A) to the load 5.

Figure 4:
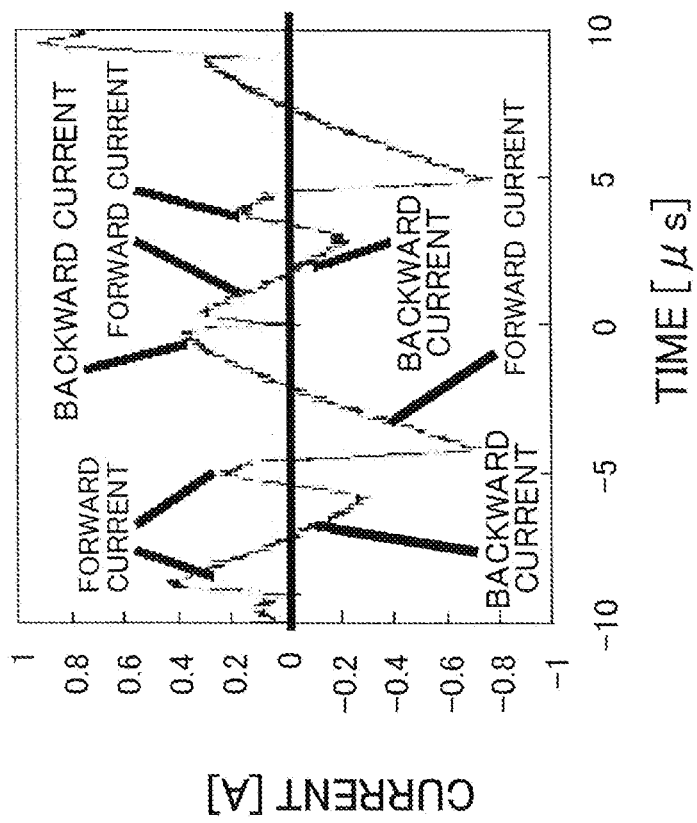
FIG. 4 is a time chart showing a measurement result of an electric current output from a secondary winding of a transformer during a low power transmission period of a DC-DC converter as a comparative example.

As understood from comparison of FIG. 2 and FIG. 4, in the comparative example, the recovery current is large; accordingly, a large current flows in the opposite direction and the power loss becomes large, while almost no recovery current flows in the DC-DC converter according to the first embodiment of the present invention; accordingly, there is almost no backward current and the power loss is small. As a result of this, in the low power transmission of the output voltage 250 V and output current 0.1 A, the power transmission efficiency is 52% in the comparative example, while the power transmission efficiency increases to 89% in the DC-DC converter according to the first embodiment of the present invention.

In the meantime, it is desirable that source-drain withstand voltages of the low withstand voltage transistors Q2, Q4, Q6, and Q8 are in a range of 3 to 200 V. If the source-drain withstand voltages of the low withstand voltage transistors Q2, Q4, Q6, and Q8 exceed 200 V, the recovery currents in the low withstand voltage transistors Q2, Q4, Q6, and Q8 increase. Besides, in a case where the source-drain withstand voltages of the low withstand voltage transistors Q2, Q4, Q6, and Q8 are under 3 V, durability of the low withstand voltage transistors Q2, Q4, Q6, and Q8 to noise in the power source circuit declines.

Besides, it is desirable that source-drain withstand voltages of the high withstand voltage transistors Q1, Q3, Q5, and Q7 are in a range of 3 times or higher to 100 times or less than the source-drain withstand voltages of the low withstand voltage transistors Q2, Q4, Q6, and Q8. In a case where the source-drain withstand voltages of the high withstand voltage transistors Q1, Q3, Q5, and Q7 are smaller than 3 times the source-drain withstand voltages of the low withstand voltage transistors Q2, Q4, Q6, and Q8, difference between the recovery current of the high withstand voltage transistor and the recovery current of the low withstand voltage transistor becomes small, and the effect of the present embodiment becomes small. Besides, in a case where the source-drain withstand voltages of the high withstand voltage transistors Q1, Q3, Q5, and Q7 are larger than 100 times the source-drain withstand voltages of the low withstand voltage transistors Q2, Q4, Q6, and Q8, the durability of the low withstand voltage transistor to switching noise declines.

In the present embodiment, voltages, which are higher than sum voltages obtained by adding the threshold value voltages of the high withstand voltage transistors Q1, Q3, Q5, and Q7 to the source potentials of the low withstand voltage transistors Q2, Q4, Q6, and Q8, are applied to the gates of the high withstand voltage transistors Q1, Q3, Q5, and Q7, respectively. Because of this, it is possible to nearly nullify voltage difference between the source and drain of each of the high withstand voltage transistors Q1, Q3, Q5, and Q7. Accordingly, it is possible to fully show the effect of reducing the recovery currents of the high withstand voltage transistors Q1, Q3, Q5, and Q7.

Besides, in the present embodiment, the capacitor C1 is connected between the gate of the high withstand voltage transistor Q1 and the one end of the secondary winding L2 of the transformer T1, and the capacitor C2 is connected between the gate of the high withstand voltage transistor Q5 and the end portion of the smoothing reactor L3 not-connected to the secondary winding L2. Further, the cathodes of the diodes D1, D2 are connected to the gates of the high withstand voltage transistors Q1, Q5, respectively. A structure is employed, in which voltages, which are higher than the threshold value voltages of the high withstand voltage transistors Q1, Q5, are applied to the anodes of the diodes D1, D2, respectively. In this way, even if a voltage occurring in the secondary winding L2 of the transformer T1 changes during the period of supplying the d.c. power to the load 5, it is possible to continue to give a voltage enough to turn on the high withstand voltage transistors Q1, Q5 to the gates of the high withstand voltage transistors Q1, Q5 because of the capacitance coupling of the capacitors C1, C2; accordingly, it is possible to surely reduce the recovery currents of the high withstand voltage transistors Q1, Q5.

Besides, in a case where the power supply to the load 5 is not performed, the gate potentials of the high withstand voltage transistors Q1, Q5 stabilize at potentials that are respectively near a potential of the one end of the secondary winding L2 of the transformer T1 and a potential of the end portion of the smoothing reactor L3 not-connected to the secondary winding L2 because of the capacitance coupling of the capacitors C1, C2. Because of this, it is possible to prevent the high withstand voltage transistors Q1, Q5 from being turned on unsuitably by surge or the like; accordingly, it is possible to raise safety.

In the present embodiment, it is possible to switch the on/off of each element of the rectification bridge circuit; accordingly, it is also possible to use the DC-DC converter as a two-way DC-DC converter.

Figure 5:
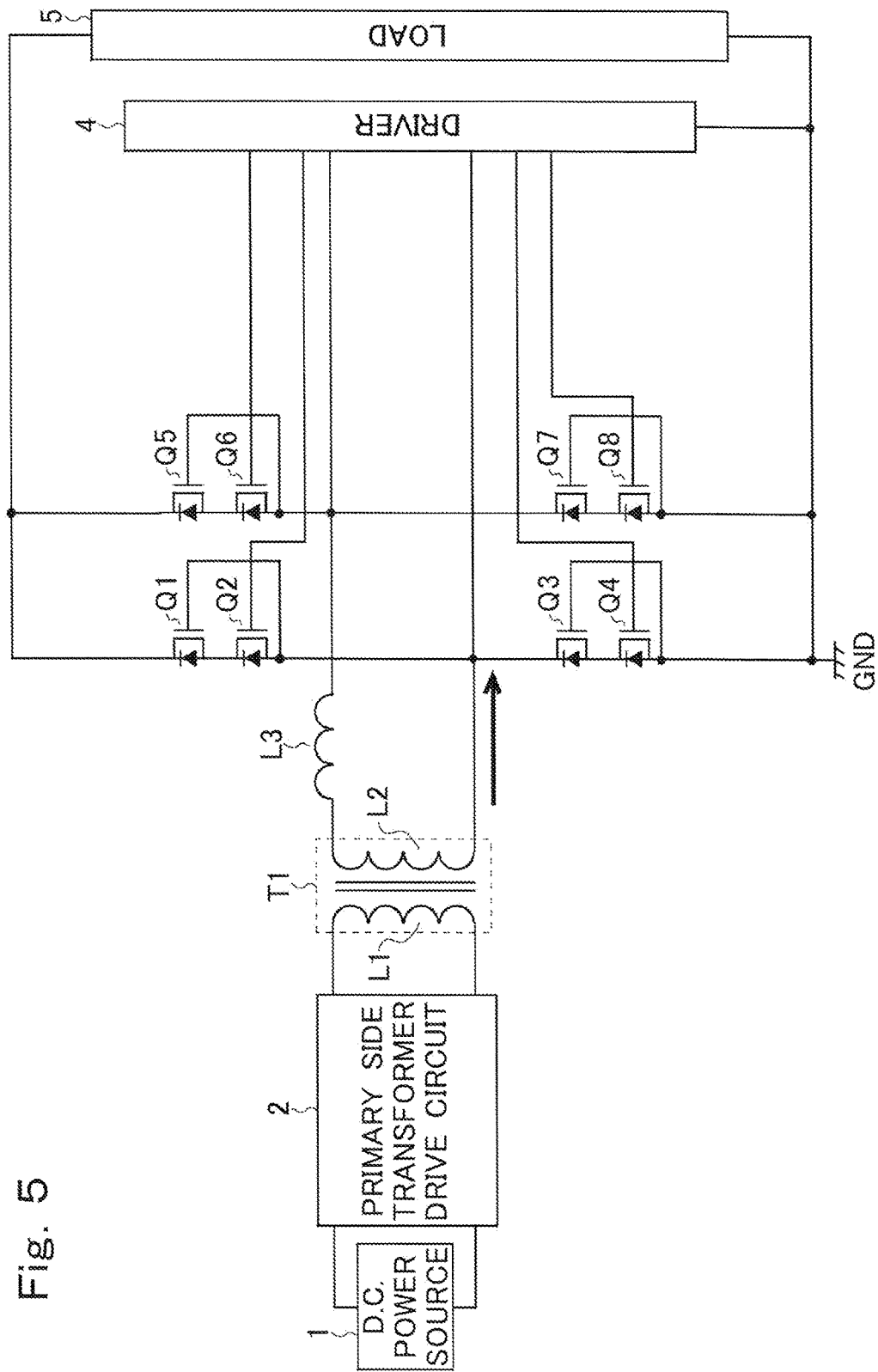
FIG. 5 is a circuit block diagram showing a modification example of the DC-DC converter according to the first embodiment of the present invention.

In the present embodiment, the high withstand voltage transistors Q1, Q3, Q5, and Q7 are transistors of enhancement type. However, the high withstand voltage transistors Q1, Q3, Q5, and Q7 may be changed to transistors of depletion type. In the case where the high withstand voltage transistors Q1, Q3, Q5, and Q7 are changed to transistors of depletion type, as shown in FIG. 5, the gates of the high withstand voltage transistors Q1, Q3, Q5, and Q7 are connected to the sources of the low withstand voltage transistors Q2, Q4, Q6, and Q8, respectively.

Besides, in the present embodiment, the electric current is flowed in the parasitic diodes of the low withstand voltage transistors Q4, Q6 (or Q2, Q8) by normally keeping the low withstand voltage transistors Q4, Q6 (or Q2, Q8), which are prohibited from being switched, at the off-state, which is however not limiting, but synchronous rectification may be performed. In the synchronous rectification, when an electric current begins to flow in the parasitic diodes of the low withstand voltage transistors Q4, Q6 (or Q2, Q8), the low withstand voltage transistors Q4, Q6 (or Q2, Q8) are turned on, and the low withstand voltage transistors Q4, Q6 (or Q2, Q8) are turned off immediately before the low withstand voltage transistors Q2, Q8 (or Q4, Q6) under switching are turned on, namely, immediately before the electric current stops flowing in the low withstand voltage transistors Q4, Q6 (or Q2, Q8). In this way, it is possible to further reduce the power loss.

Second Embodiment

Figure 6:
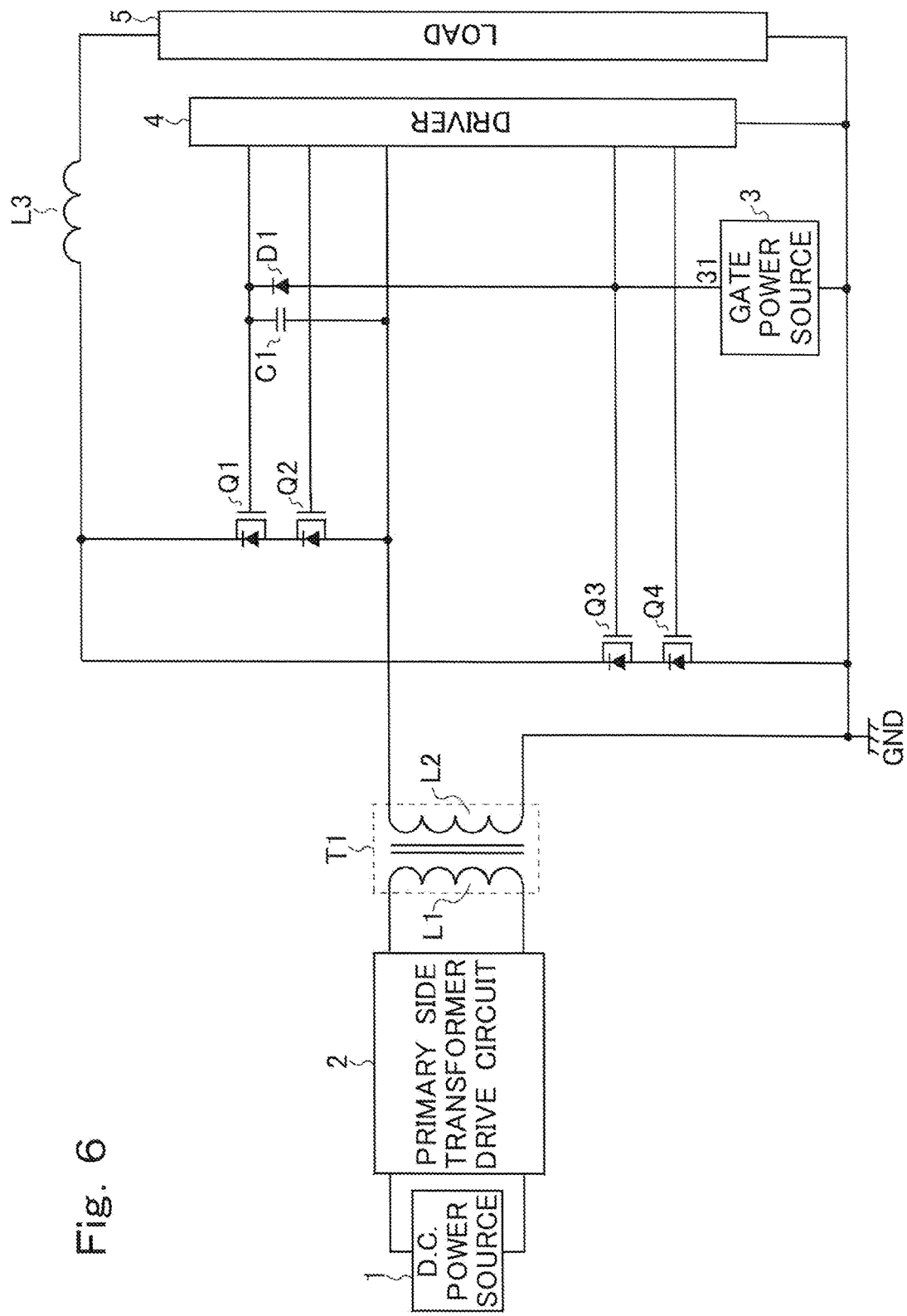
FIG. 6 is a circuit block diagram showing a structure of a DC-DC converter according to a second embodiment of the present invention.

FIG. 6 shows a structure of a DC-DC converter according to a second embodiment of the present invention. In the meantime, in FIG. 6, the same components as FIG. 1 are indicated by the same reference numbers and detailed description of them is skipped.

The DC-DC converter according to the second embodiment of the present invention is different from the DC-DC converter according to the first embodiment of the present invention in that the rectification circuit disposed on the secondary side of the transformer T1 is composed of only the high withstand voltage transistors Q1, Q3 and the low withstand voltage transistors Q2, Q4 unlike the rectification bride circuit of full bridge type of the DC-DC converter according to the first embodiment of the present invention.

Also in the DC-DC converter according to the second embodiment of the present invention, like in the DC-DC converter according to the first embodiment of the present invention, almost no recovery current flows; accordingly, there is almost no backward current and the power loss is small. As a result of this, it is possible to raise the power transmission efficiency also in the low power transmission.

Third Embodiment

Figure 7:
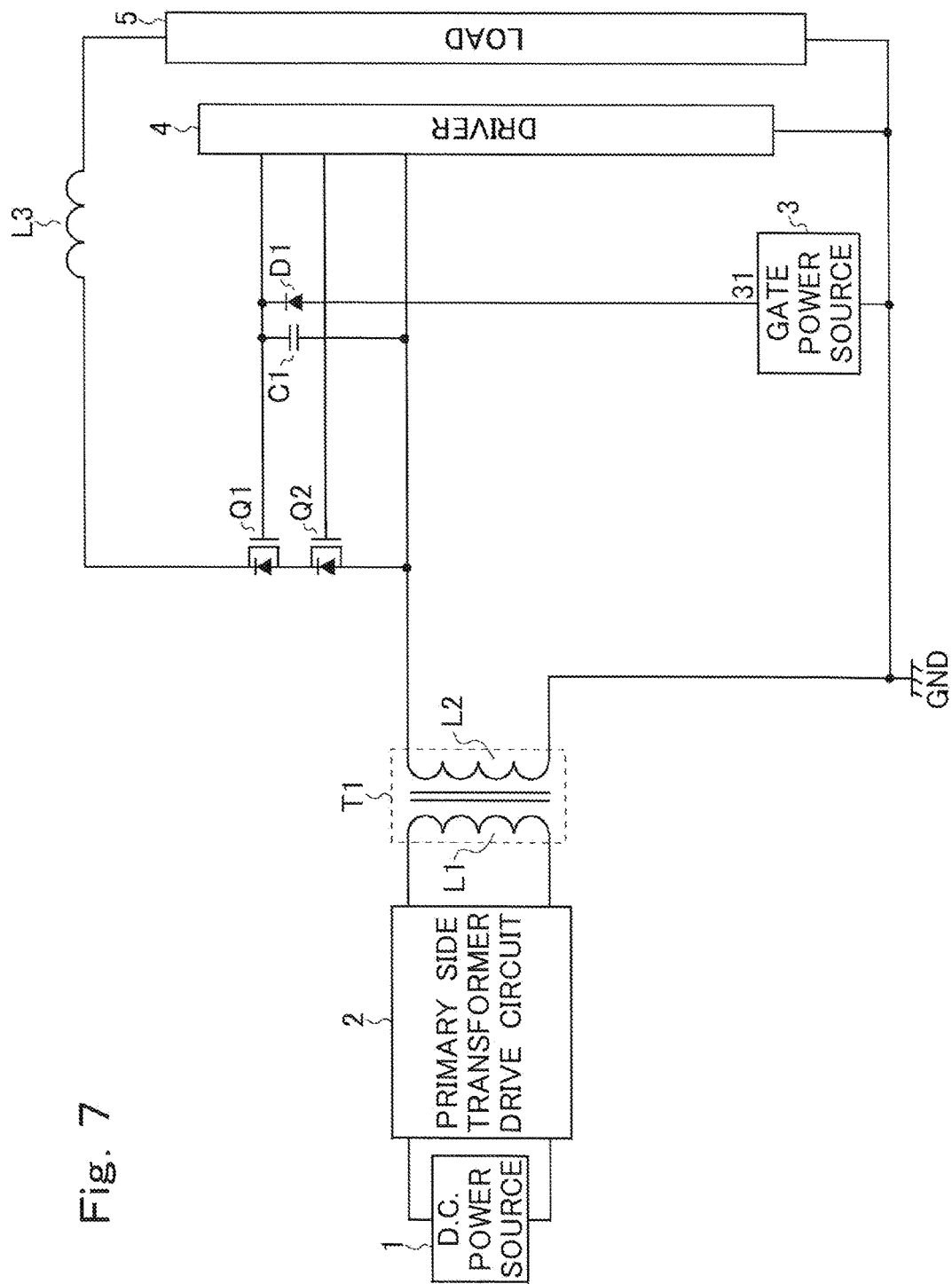
FIG. 7 is a circuit block diagram showing a structure of a DC-DC converter according to a third embodiment of the present invention.

FIG. 7 shows a structure of a DC-DC converter according to a third embodiment of the present invention. In the meantime, in FIG. 7, the same components as FIG. 1 are indicated by the same reference numbers and detailed description of them is skipped.

The DC-DC converter according to the third embodiment of the present invention is different from the DC-DC converter according to the first embodiment of the present invention in that the rectification circuit disposed in the secondary side of the transformer T1 is composed of only the high withstand voltage transistors Q1 and the low withstand voltage transistors Q2 unlike the rectification bride circuit of full bridge type of the DC-DC converter according to the first embodiment of the present invention.

Also in the DC-DC converter according to the third embodiment of the present invention, like in the DC-DC converter according to the first embodiment of the present invention, almost no recovery current flows; accordingly, there is almost no backward current and the power loss is small. As a result of this, it is possible to raise the power transmission efficiency also in the low power transmission.

Fourth Embodiment

Figure 8:
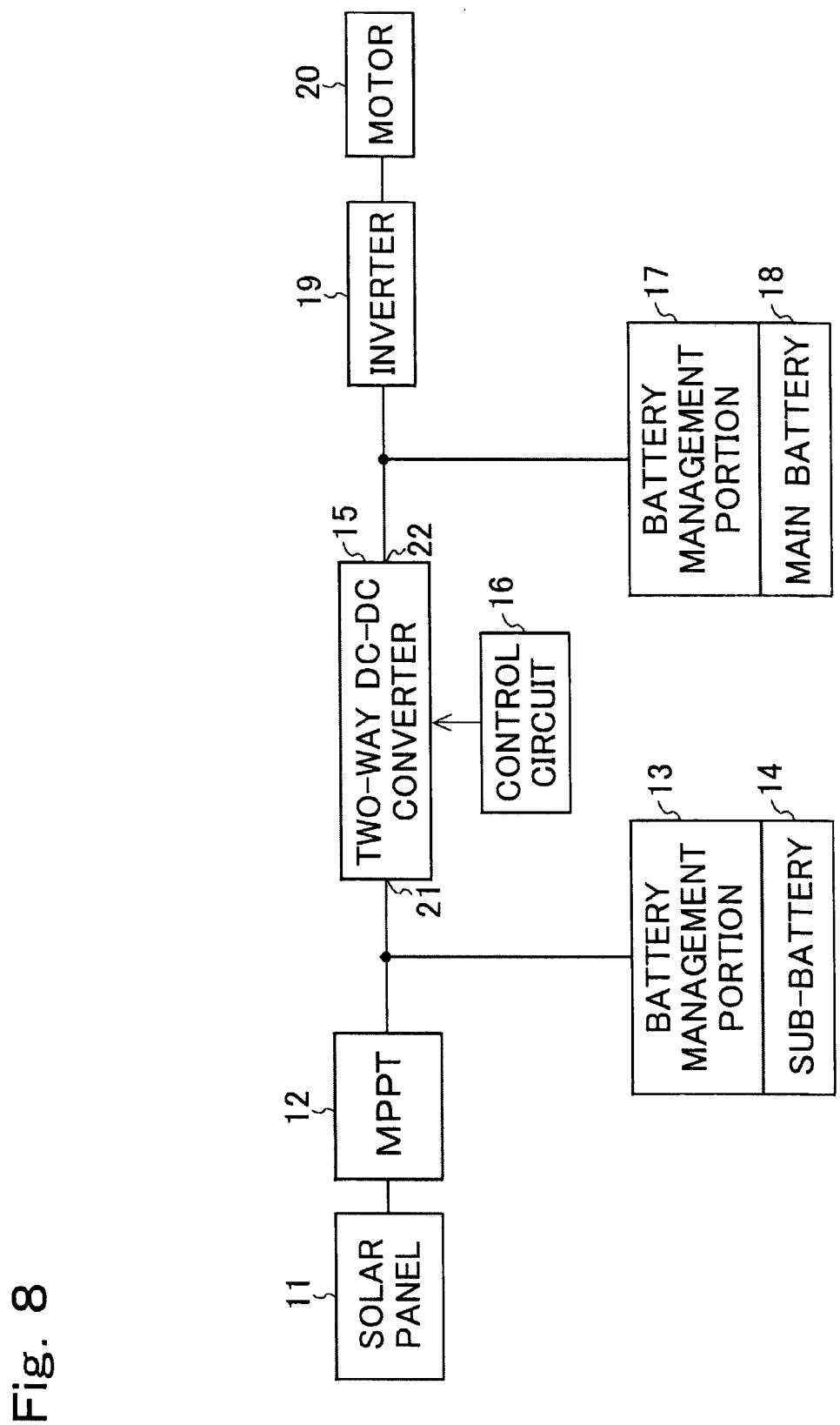
FIG. 8 is a view showing a schematic structure of a mobile body according to a fourth embodiment of the present invention.

FIG. 8 is a view showing a schematic structure of a mobile body according to a fourth embodiment of the present embodiment. In the meantime, in FIG. 8, a connection line connected to a ground potential is not shown. The mobile body shown in FIG. 8 is, for example, an electric car, an electric bike or the like, and comprises: a solar power controller that includes a solar panel 11, an MPPT (Maximum Power Point Tracking) 12, a battery management portion 13, a sub-battery 14, a two-way DC-DC converter 15, a control circuit 16, a battery management portion 17, and a main battery 18; an inverter 19; and a motor 20.

The solar panel 11 arranges therein a plurality of solar battery cells in a panel shape and is disposed on a roof of an electric car, for example.

The MPPT 12 is a DC-DC converter that controls an operation point of the solar panel 11 to maximize power generation of the solar panel 11. An output end of the solar panel 11 is connected to an input end of the MPPT 12, and an output end of the MPPT 12 is connected to the sub-battery 14.

The battery management portion 13 manages the sub-battery 14 to control charge and discharge of the sub-battery 14.

The battery management portion 17 manages the main battery 18 to control charge and discharge of the main battery 18.

In the present embodiment, a voltage of the main battery 18 is larger than a voltage of the sub-battery 14. For example, by setting a voltage range of the main battery 18 at 100 to 600 V and setting a voltage range of the sub-battery at 10 to 48 V, the voltage range of the main battery 18 becomes a range suitable for driving the motor 20, and the voltage range of the sub-battery 14 becomes a range suitable for charging the power generated at the solar panel 11.

The two-way DC-DC converter 15 is, for example, the DC-DC converter according to any one of the above first to third embodiments, and transmits power between the sub-battery 14 and the main battery 18. A first input/output terminal 21 of the two-way DC-DC converter 15 is connected to the sub-battery 14 via the battery management portion 13, and a second input/output terminal 22 of the two-way DC-DC converter 15 is connected to the main battery 18 via the battery management portion 17.

The control portion 16 controls power transmission (output voltage or output current) of the two-way DC-DC converter 15.

The inverter 19 converts a d.c. voltage output from the main battery 18 into a motor drive a.c. voltage. The motor 20 is driven to rotate by the motor drive a.c. voltage output from the inverter 19. A drive wheel of the mobile body rotates because of the rotation of the motor 20. Regenerative energy occurring in the motor 20 during a damping period of the mobile body is recovered by the battery management portion 17 and stored into the main battery 18. Besides, a d.c. voltage output from the sub-battery 14 is used as a power source for electrical components such as a headlight and the like.

Others

It should be considered that the embodiments disclosed this time are examples in all respects and are not limiting. It is intended that the scope of the present invention is not indicated by the above description but by the claims, and all modifications within the scope of the claims and the meaning equivalent to the claims are covered.

REFERENCE SIGNS LIST 1 d.c. power source
2 primary side transformer drive circuit
3 gate power source 4 driver
5 load
11 solar panel
12 MPPT
13 battery management portion
14 sun-battery
15 two-way DC-DC converter
16 control circuit
17 battery management portion
18 main battery
19 inverter
20 motor
21 first input/output terminal
22 second input/output terminal
31 first output terminal
32 second output terminal
C1, C2 capacitors
D1, D2 diodes
L1 primary winding
L2 secondary winding
L3 smoothing reactor
Q1, Q3, Q5, Q7 high withstand voltage transistors (N-channel MOS transistors)
Q2, Q4, Q6, Q8 low withstand voltage transistors (N-channel MOS transistors)
T1 transformer

The invention claimed is:

1. A DC-DC converter comprising:
a transformer,
a switching circuit disposed on a primary side of the transformer, and
a rectification circuit disposed on a secondary side of the transformer,
the rectification circuit including a first rectification portion, the first rectification portion including a series-connected body of a first transistor and a second transistor, a source terminal of the first transistor being connected to a drain terminal of the second transistor,
one terminal of the transformer being connected to one of a drain terminal of the first transistor or a source terminal of the second transistor,
each of the first and second transistors including a parasitic diode, connected in a forward direction from the respective source terminal of the respective first and second transistors to the respective drain terminal of the respective first and second transistors, and
wherein a withstand voltage between the respective source terminal and the respective drain terminal of the first transistor being relatively higher than a withstand voltage between the respective source terminal and the respective drain terminal of the second transistor, and
wherein the first and second transistors are a group of switches that turn from OFF to ON together.

2. The DC-DC converter according to claim 1, wherein the rectification circuit includes a second rectification portion, the second rectification portion including a series-connected body of a third transistor and a fourth transistor, a source terminal of the third transistor being connected to a drain terminal of the fourth transistor,
the one terminal of the transformer being connected to the source terminal of the second transistor and another terminal of the transformer being connected to a source terminal of the fourth transistor,
the drain terminal of the first transistor being connected to a drain terminal of the third transistor,
each of the third and fourth transistors including a parasitic diode, connected in a forward direction from the source terminal to the drain terminal, and
a withstand voltage between the source terminal and the drain terminal of the third transistor being relatively higher than a withstand voltage between the source terminal and the drain terminal of the fourth transistor.

3. The DC-DC converter according to claim 1, wherein all (2k−1)th (k is a natural number) transistors included in the rectification circuit are transistors of depletion type, and all (2k)th (k is a natural number) transistors included in the rectification circuit are transistors of enhancement type.

4. The DC-DC converter according to claim 1, wherein all (2k−1)th (k is a natural number) transistors and all (2k)th (k is a natural number) transistors included in the rectification circuit are transistors of enhancement type.

5. The DC-DC converter according to claim 1, wherein an output voltage from the DC-DC converter is set in a range of 100 V to 1000 V.

6. A solar power controller comprising a DC-DC converter according to claim 1.

7. A mobile body comprising a DC-DC converter according to claim 1.

8. A DC-DC converter comprising:
a transformer,
a switching circuit disposed on a primary side of the transformer, and
a rectification circuit disposed on a secondary side of the transformer, the rectification circuit including a first rectification portion, the first rectification portion including a series-connected body of a first transistor and a second transistor whose first electrode is connected to a second electrode of the first transistor,
each of the first and second transistors including a parasitic diode connected in a forward direction between the second and first electrodes,
wherein a withstand voltage between the first and second electrodes of the first transistor is relatively higher than a withstand voltage between the first and second electrodes of the second transistor,
wherein the rectification circuit is a rectification bridge circuit including:
 a second rectification portion including a series-connected body of a third transistor and a fourth transistor whose first electrode is connected to a second electrode of the third transistor,
 a third rectification portion including a series-connected body of a fifth transistor and a sixth transistor whose first electrode is connected to a second electrode of the fifth transistor,
 a fourth rectification portion including a series-connected body of a seventh transistor and an eighth transistor whose first electrode is connected to a second electrode of the seventh transistor,
and wherein
 the first electrode of the first transistor is connected to the first electrode of the fifth transistor,
 the second electrode of the second transistor is connected to the first electrode of the third transistor,
 the second electrode of the sixth transistor is connected to the first electrode of the seventh transistor,
 the second electrode of the fourth transistor is connected to the second electrode of the eighth transistor, each of the third, fourth, fifth, sixth, seventh, and eighth transistors includes a parasitic diode connected in a forward direction between the second and first electrodes, a withstand voltage between the first and second electrodes of the third transistor is relatively higher than a withstand voltage between the first and second electrodes of the fourth transistor, a withstand voltage between the first and second electrodes of the fifth transistor is relatively higher than a withstand voltage between the first and second electrodes of the sixth transistor, and a withstand voltage between the first and second electrodes of the seventh transistor is relatively higher than a withstand voltage between the first and second electrodes of the eighth transistor.

9. A solar power controller comprising a DC-DC converter according to claim 8.

10. A mobile body comprising a DC-DC converter according to claim 8.

11. The DC-DC converter according to claim 8, wherein the rectification circuit includes a second rectification portion, the second rectification portion including a series-connected body of the third transistor and the fourth transistor, a source terminal of the third transistor being connected to a drain terminal of the fourth transistor, one terminal of the transformer being connected to a source terminal of the second transistor and another terminal of the transformer being connected to a source terminal of the fourth transistor, a drain terminal of the first transistor being connected to a drain terminal of the third transistor, each of the third and fourth transistors including a parasitic diode, connected in a forward direction from a source terminal to a drain terminal, and a withstand voltage between the source terminal and the drain terminal of the third transistor being relatively higher than a withstand voltage between the source terminal and the drain terminal of the fourth transistor.

12. The DC-DC converter according to claim 8, wherein all (2k−1)th (k is a natural number) transistors included in the rectification circuit are transistors of depletion type, and all (2k)th (k is a natural number) transistors included in the rectification circuit are transistors of enhancement type.

13. The DC-DC converter according to claim 8, wherein all (2k−1)th (k is a natural number) transistors and all (2k)th (k is a natural number) transistors included in the rectification circuit are transistors of enhancement type.

14. The DC-DC converter according to claim 8, wherein an output voltage from the DC-DC converter is set in a range of 100 V to 1000 V.

15. The DC-DC converter according to claim 8, wherein the first transistor and the second transistor are configured to conduct simultaneously.

* * * * *